United States Patent
Huang et al.

(10) Patent No.: US 9,904,139 B2
(45) Date of Patent: Feb. 27, 2018

(54) COLOR FILTER SUBSTRATE, DISPLAY PANEL AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Lei Huang, Beijing (CN); Kai Xu, Beijing (CN); Yue Hu, Beijing (CN); Xinwei Gao, Beijing (CN); Lifang Song, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/208,844

(22) Filed: Jul. 13, 2016

(65) Prior Publication Data

US 2017/0269450 A1    Sep. 21, 2017

(30) Foreign Application Priority Data

Mar. 18, 2016   (CN) .......................... 2016 1 0158045

(51) Int. Cl.
| | |
|---|---|
| *G02F 1/15* | (2006.01) |
| *G02F 1/153* | (2006.01) |
| *G09G 3/38* | (2006.01) |
| *G02F 1/157* | (2006.01) |
| *G02B 5/20* | (2006.01) |
| *G02F 1/1335* | (2006.01) |

(Continued)

(52) U.S. Cl.
CPC ............ *G02F 1/157* (2013.01); *G02B 5/201* (2013.01); *G02F 1/133514* (2013.01); *G02F 1/15* (2013.01); *G02F 1/163* (2013.01); *G09G 3/38* (2013.01); *G02F 1/0018* (2013.01); *G02F 1/0102* (2013.01); *G02F 2001/1502* (2013.01); *G02F 2201/44* (2013.01)

(58) Field of Classification Search
CPC .... G02F 1/01; G02F 1/0102; G02F 1/133514; G02F 1/13473; G02F 1/009; G02F 1/0018; G02F 1/15; G02F 1/153; G02F 1/155; G02F 1/157; G02F 1/167; G02F 2001/1502; G02F 2201/16; G02F 2201/30; G02F 2201/44; G02F 2201/52; G09G 3/38; G02B 5/201
USPC ............... 359/238, 242, 265, 273, 275, 296; 345/105
See application file for complete search history.

(56) References Cited

U.S. PATENT DOCUMENTS

| | | | |
|---|---|---|---|
| 7,649,669 B2* | 1/2010 | Abe ................... | G02F 1/133514 359/242 |
| 8,902,153 B2* | 12/2014 | Bouchard ............... | G02F 1/167 345/107 |

(Continued)

*Primary Examiner* — Loha Ben
(74) *Attorney, Agent, or Firm* — Ladas & Parry LLP

(57) ABSTRACT

A color filter substrate, a display panel and a display device are provided. The color filter substrate includes a base substrate, the base substrate being divided into a plurality of pixel units, each pixel unit including a plurality of sub-pixel units, a color filter being arranged in each sub-pixel unit. At least one color filter of the plurality of sub-pixel units in each of the pixel units is made of an electrochromic material.

15 Claims, 1 Drawing Sheet

(51) Int. Cl.
*G02F 1/163* (2006.01)
*G02F 1/00* (2006.01)
*G02F 1/01* (2006.01)

(56) References Cited

U.S. PATENT DOCUMENTS 9,599,851 B2 * 3/2017 Zhang .................... G02F 1/15
9,740,072 B2 * 8/2017 Yu ........................ G02F 1/1521

* cited by examiner

COLOR FILTER SUBSTRATE, DISPLAY PANEL AND DISPLAY DEVICE

TECHNICAL FIELD

The present disclosure relates to a color filter substrate, a display panel comprising the color filter substrate and a display device comprising the display panel.

BACKGROUND

An Active Matrix Organic Light Emitting Diode (AMOLED) is highly favored by people due to its advantages such as fast response, high contrast, wide viewing angle and so on. In current mainstream Organic Light Emitting Diode (OLED) products, there are mainly two preparation methods: one is that a small-sized Organic Light Emitting Diode (OLED) display screen represented by Samsung mainly uses a fine mask to fabricate sub-pixels which can emit blue, red and green lights to realize color display; the other is that a large-sized Organic Light Emitting Diode (OLED) display screen represented by LG mainly uses an open mask to fabricate an Organic Light Emitting Diode (OLED) device which can emit white light, to realize color display with a WRGB color filter. A W pixel is designed to compensate for luminance in specific display, so that a service life of the Organic Light Emitting Diode (OLED) can be increased.

However, in a process of using the latter Organic Light Emitting Diode (OLED) display device, there is a common problem: in an existing color filter substrate, color filters in sub-pixels thereof are usually made of a resin material, which cannot meet needs of some occasions, so that a scope of application is limited. Therefore, a new color filter substrate is needed to solve the problem described above in the prior art.

SUMMARY

An embodiment of the disclosure provides a color filter substrate, comprising a base substrate, the base substrate being divided into a plurality of pixel units, each pixel unit including a plurality of sub-pixel units, a color filter being arranged in each sub-pixel unit, wherein, at least one color filter of the plurality of sub-pixel units in each of the pixel units is made of an electrochromic material.

Another embodiment of the disclosure provides a display panel comprising the color filter substrate as mentioned above.

Another embodiment of the disclosure provides a display device comprising the display panel as mentioned above.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Figure 1:
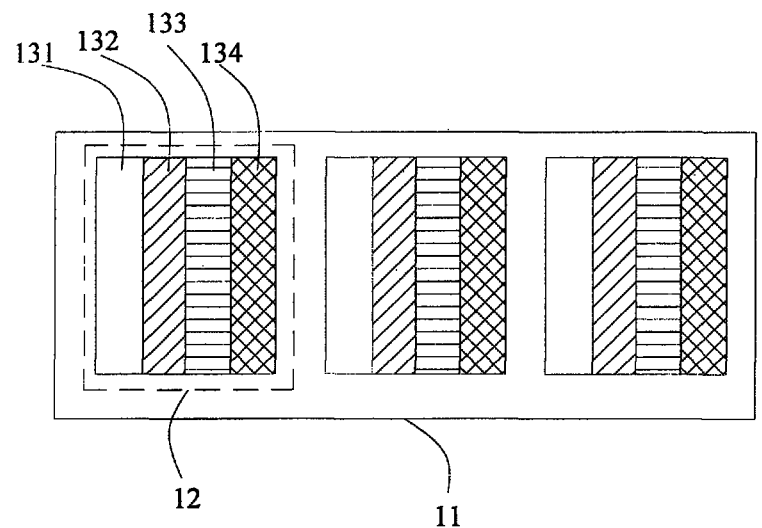
FIG. 1 is a structural schematic diagram of a color filter substrate provided by the present disclosure.

As a first aspect of the present disclosure, as illustrated in FIG. 1, a color filter substrate is provided, and the color filter substrate comprises a base substrate 11, for example, the base substrate 11 may be a glass substrate; the base substrate 11 is divided into a plurality of pixel units 12, each pixel unit 12 includes a plurality of sub-pixel units, and a color filter is arranged in each sub-pixel unit. At least one color filter of the plurality of sub-pixel units in each pixel unit 12 is made of an electrochromic material.

In the present disclosure, a control voltage may be provided to the color filter made of the electrochromic material, so that the color filter may display a predetermined color, and light passing through the color filter may display the predetermined color, and thus color display of a display device may be realized.

It can be understood that, the electrochromic material indicates a phenomenon where optical properties (e.g., reflectivity, transmissivity, absorptivity, etc.) of a material change stably and reversibly under the influence of an external electric field, which manifests in appearance as a reversible change in color and transparency, and a material having the electrochromic property may be called an electrochromic material.

It can be easily understood by the skilled in the art that, in order to make the pixel units display different colors, as an implementation mode of the present disclosure, different color filters have different colors at the time of displaying. In an implementation mode of the present disclosure, one pixel unit may include three sub-pixel units, and at the time of displaying, the color filters in the three sub-pixel units may be a red color filter, a blue color filter and a green color filter, respectively. The three color filters may be all made of an electrochromic material, or, any one or two of the three color filters may be made of an electrochromic material.

In another implementation mode of the present disclosure, one pixel unit may include four sub-pixel units, and at the time of displaying, the color filters in the four sub-pixel units may be a red color filter, a green color filter, a blue color filter and a complementary color filter (which may be a yellow color filter or a color filter of any other color), respectively.

It can also be easily understood by the skilled in the art that, speeds of attenuation of light of different colors vary. When an image is displayed, light emitted from different sub-pixel units have different colors. In order to make images viewed at different distances not distorted, for example, one color filter of the plurality of sub-pixel units in each of the pixel units is made of an electrochromic material, and when the color filter made of the electrochromic material receives a control voltage, the color filter made of the electrochromic material has a same color as a color filter of a sub-pixel unit having a fastest attenuation in light passing through color filters of the other multiple sub-pixel units in the pixel unit. That is to say, the at least one color filter made of an electrochromic material in each pixel unit at the time of receiving a control voltage has a same color as light having a fastest attenuation in light passing through other color filters in the pixel unit.

It is assumed that, light of color X in one pixel unit has a fastest light attenuation speed, and accordingly, the color filter made of the electrochromic material after receiving a control voltage has a color X, too. At the time of displaying, one pixel unit has two sub-pixel units emitting light of color X, so that disadvantages caused by fast attenuation of the light of color X may be offset, and thus images viewed at different distances may be not distorted, that is, an image of real color may be viewed regardless of distance.

It can be understood that, the color filters of two or more different colors in the plurality of sub-pixel units of the pixel unit 12 may be selected to be made of an electrochromic material, so that attenuation in color of light after the light passes through the color filters of two or more different colors in the plurality of sub-pixel units of the pixel unit 12 may be compensated, to make color displayed in a liquid crystal display device relatively uniform.

As an implementation mode, it can be known from the above that, as illustrated in FIG. 1, when the one color filter of the plurality of sub-pixel units in each pixel unit 12 is made of an electrochromic material, except the color filter 131 made of the electrochromic material, other color filters of the plurality of sub-pixel units in the pixel unit 12 may further include a red color filter 132, a blue color filter 133 and a green color filter 134, and color of the color filter 131 made of the electrochromic material is changed to blue after receiving the control voltage. In order to reduce cost, the red color filter 132, the blue color filter 133 and the green color filter 134 are all made of a resin material.

The light passing through the red color filter 132 is red light, the light passing through the blue color filter 133 is blue light, and the light passing through the green color filter 134 is green light. It can be easily understood by the skilled in the art that, among the light of the three colors, i.e., the red light, the blue light and the green light, the blue light has a fastest attenuation speed. The color filter 131 made of the electrochromic material is blue at the time of displaying, and therefore, in one pixel unit, two sub-pixel units emit blue light, to increase brightness of the blue light, further offsetting distortion in color caused by fast attenuation of the blue light.

It can be further understood that, in a sub-pixel unit of one pixel unit 12, before applying a control voltage to the color filter 131 made of the electrochromic material, the color filter 131 made of the electrochromic material may be white.

Figure 2:
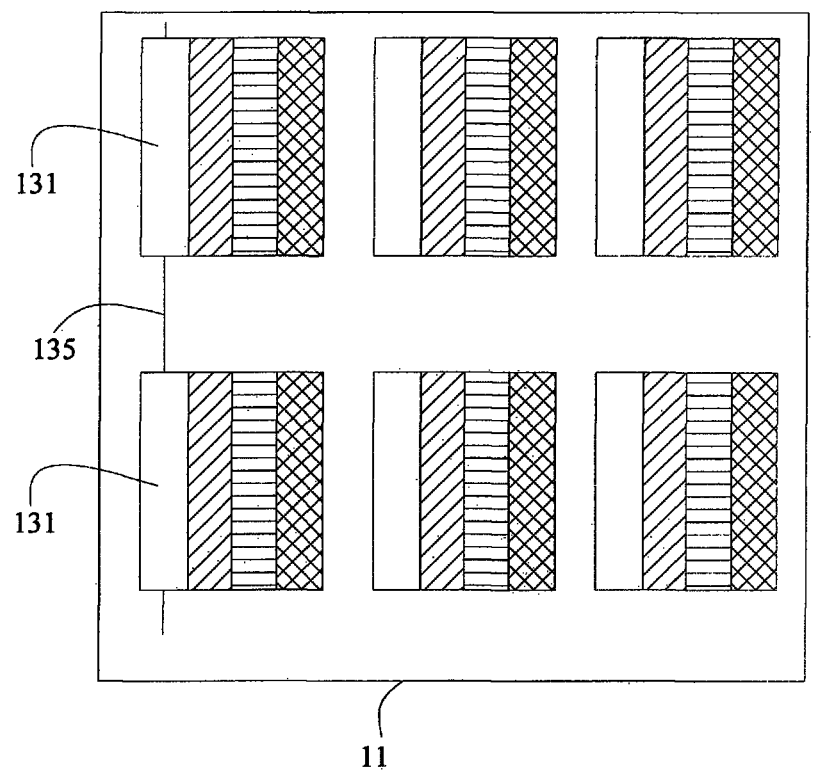
FIG. 2 is a structural schematic diagram of color filters connected by a conductive layer provided by the present disclosure.

It should be noted that, colors of the color filters illustrated in FIG. 1 and FIG. 2 are only exemplary, which is not limited to red, green and blue described above, may further be any other color, such as yellow and so on, and can be selected according to needs. In addition, depths of light color after the light passes through the color filter made of the electrochromic material may be controlled by adjusting a magnitude of the control voltage.

As an implementation mode, the electrochromic materials include an inorganic electrochromic material and an organic electrochromic material, and because $WO_3$ in the inorganic electrochromic material has higher optical adjustment capability and better electrochromic stability than other electrochromic materials, the preferred electrochromic material in the present disclosure includes a $WO_3$ material. In addition, the $WO_3$ material further has an advantage of low price.

For example, after the electrochromic material in the present disclosure is selected the $WO_3$ material, when the applied control voltage is up to a millivolt level, light passing through the color filter 131 made of the $WO_3$ material is blue.

As another preferred implementation mode, there are a plurality of pixel units 12 in the one color filter substrate, there are a plurality of sub-pixel units in one pixel unit 12, and the one color filter is arranged in each sub-pixel unit; if the plurality of the color filters 131 made of the electrochromic material in the pixel unit 12 are arranged in a same row but different columns, in order to facilitate applying a control voltage to the color filters 131 made of the electrochromic material, for example, as illustrated in FIG. 2, the color filter substrate may further comprise a conductive layer, the conductive layer includes a plurality of conductive parts 135, and two adjacent color filters made of the electrochromic material in the same column are electrically connected with each other by one conductive part. It can be seen from FIG. 2 that, the color filters 131 located in a same column are connected in series.

In the present disclosure, a material of the conductive part 135 is not specifically required, as long as it can electrically connect the two adjacent color filters made of the electrochromic material with each other. For example, the conductive part 135 may be made of a metal material, or, the conductive part 135 may be made of a transparent electrode material. As a preferred implementation mode of the present disclosure, the conductive part 135 may be made of a metal material (e.g., metal aluminum).

It should be noted that, since there are other leading wires on the color filter substrate, it is necessary to keep away from the other leading wires on the color filter substrate when arranging the conductive part 135.

For example, when the color filter is formed on the base substrate 11, the color filter 131 made of the electrochromic material may be formed on the base substrate 11 in a manner of magnetron sputtering at first, and then the conductive part 135 is made of a conductive material aluminum, to connect the color filters 131 made of the electrochromic material located in a same column but different rows with each other in series; or, the conductive parts 135 are arranged in a direction of a same row but different columns at first, and then the color filter 131 made of the electrochromic material may be formed in a direction of the same column in a manner of magnetron sputtering. Finally, other color filters are formed by a photoengraving process, for example, a red color filter 132, a blue color filter 133 and a green color filter 134 and so on are formed.

It can be understood that, in a process of preparing the color filter substrate, an arrangement of the plurality of sub-pixel units in the pixel unit 12 is not limited, for example, may be arranged in a plurality of rows and columns, or may be arranged in parallel, and a size of the color filter in the sub-pixel unit is not limited, which may be designed according to individual needs.

In the color filter substrate provided by the present disclosure, by arranging a color filter made of an electrochromic material, after the color filter is applied a control voltage, the color filter has a same color as a color filter of a sub-pixel unit having a fastest attenuation in light of color filters of other plurality of sub-pixel units in the pixel unit, so as to compensate color for light passing through the color filter having a fast attenuation. The compensation method for light color in the present disclosure may make an image of real color be seen at any distance, to improve user experience.

As a second aspect of the present disclosure, a display panel is provided, and the display panel comprises the color filter substrate described above.

In the present disclosure, a specific type of the display panel is not particularly limited, for example, the display panel may be a liquid crystal display panel, or an OLED display panel.

As a third aspect of the present disclosure, a display device is further provided, and the display device comprises the display panel described above.

The display device may be an electronic device such as a mobile phone, a television, a tablet personal computer, a navigator and so on.

As an implementation mode, the display device of the present disclosure further comprises a control module (a control circuit), and the control module is connected with the color filter substrate, for providing the control voltage to the color filter made of the electrochromic material in the color filter substrate. A magnitude of the control voltage is adjusted by the control module, so as to adjust depths of light color after the light passes through the color filter made of the electrochromic material.

For example, when the electrochromic material is a $WO_3$ material, and the control voltage provided by the control module is at a millivolt level, and at this moment, light passing through the color filter made of the $WO_3$ material is blue, that is, light passing through the color filter made of the $WO_3$ material in the display device may be blue light.

In the display device provided by the present disclosure, by arranging a color filter substrate having a color filter made of an electrochromic material and arranging a control module for providing a control voltage to the color filter substrate, color of light passing through the color filter made of the electrochromic material in the display device is changed, to compensate color for light having a fastest attenuation in light passing through the color filter in the display device, so that an image of real color may be seen at different distances, and user experience is improved.

The foregoing embodiments merely are exemplary embodiments of the present disclosure, and not intended to define the scope of the present disclosure, and the scope of the disclosure is determined by the appended claims.

The present application claims priority of Chinese Patent Application No. 201610158045.0 filed on Mar. 18, 2016, the disclosure of which is incorporated herein by reference in its entirety as part of the present application.

The invention claimed is:

1. A color filter substrate, comprising a base substrate, the base substrate being divided into a plurality of pixel units, each pixel unit including a plurality of sub-pixel units, a color filter being arranged in each sub-pixel unit, wherein at least one color filter of the plurality of sub-pixel units in each of the pixel units is made of an electrochromic material; and
wherein the at least one color filter made of the electrochromic material in each pixel unit, upon receiving a control voltage, has a same color as light having a fastest attenuation in light passing through other color filters of the pixel unit.

2. The color filter substrate according to claim 1, wherein, except the color filter made of the electrochromic material, the other color filters include a red color filter, a blue color filter and a green color filter; and wherein color of the color filter made of the electrochromic material, upon receiving the control voltage, is blue.

3. The color filter substrate according to claim 2, wherein the electrochromic material includes a $WO_3$ material.

4. The color filter substrate according to claim 1, further comprising a conductive layer, the color filters made of the electrochromic material in the plurality of pixel units being electrically connected with each other by the conductive layer.

5. The color filter substrate according to claim 4, wherein: the color filters made of the electrochromic material of the pixel units in a same column but different rows are arranged in the same column, the conductive layer includes a plurality of conductive parts, and every two adjacent color filters made of the electrochromic material in a same column direction are electrically connected with each other by the conductive parts.

6. The color filter substrate according to claim 5, wherein the conductive parts are made of a metal material.

7. A display panel, comprising the color filter substrate according to claim 1.

8. The display panel according to claim 7, wherein, except the color filter made of the electrochromic material, the other color filters include a red color filter, a blue color filter and a green color filter; and wherein color of the color filter made of the electrochromic material, upon receiving the control voltage, is blue.

9. The display panel according to claim 8, wherein the electrochromic material includes a $WO_3$ material.

10. The display panel according to claim 7, further comprising a conductive layer, the color filters made of the electrochromic material in the plurality of pixel units being electrically connected with each other by the conductive layer.

11. The display panel according to claim 10, wherein: the color filters made of the electrochromic material of the pixel units in a same column but different rows are arranged in the same column, the conductive layer includes a plurality of conductive parts, and every two adjacent color filters made of the electrochromic material in a same column direction are electrically connected with each other by the conductive parts.

12. The display panel according to claim 11, wherein the conductive parts are made of a metal material.

13. A display device, comprising the display panel according to claim 7.

14. The display device according to claim 13, wherein the display device further comprises a control circuit, the control circuit being configured for providing a control voltage to the color filter made of the electrochromic material in the color filter substrate.

15. The display device according to claim 14, wherein the electrochromic material is a $WO_3$ material, and the control voltage provided by the control circuit is at a millivolt level.

* * * * *